United States Patent [19]

Comperatore

[11] 3,904,460

[45] Sept. 9, 1975

[54] TREATING GLASS SHEETS

[75] Inventor: John A. Comperatore, Natrona Heights, Pa.

[73] Assignee: PPG Industries, Inc., Pittsburgh, Pa.

[22] Filed: Dec. 20, 1973

[21] Appl. No.: 426,758

Related U.S. Application Data

[63] Continuation of Ser. No. 103,916, Jan. 4, 1971, abandoned, which is a continuation-in-part of Ser. No. 736,019, June 11, 1968, abandoned.

[52] U.S. Cl. ............... 156/102; 156/106; 428/425; 428/437
[51] Int. Cl.$^2$ .................... B32B 17/10; B32B 31/06
[58] Field of Search ........ 156/99, 102, 106; 65/106; 161/1, 190, 199

[56] References Cited
UNITED STATES PATENTS

| | | | |
|---|---|---|---|
| 2,697,675 | 12/1954 | Gaiser | 156/106 |
| 2,850,844 | 9/1958 | White | 65/106 |
| 2,948,645 | 8/1960 | Keim | 156/106 |
| 3,287,201 | 11/1966 | Chisholm et al. | 161/1 |
| 3,290,133 | 12/1966 | Thomas | 65/106 |
| 3,298,809 | 1/1967 | Barch et al. | 65/106 |
| 3,300,351 | 1/1967 | Richardson | 156/102 |
| 3,367,764 | 2/1968 | Seymour | 65/273 |

FOREIGN PATENTS OR APPLICATIONS

| | | | |
|---|---|---|---|
| 673,378 | 11/1963 | Canada | 161/190 |

*Primary Examiner*—Daniel J. Fritsch
*Attorney, Agent, or Firm*—Edward I. Mates

[57] ABSTRACT

Shaping glass sheets individually by a press bending operation and then laminating two of said bent sheets together after one or both of the bent sheets have been optionally treated. The optional treatment may involve coating, tempering, annealing, chemical treatment, and/or the like. The sheets to be laminated may be treated differently after they are shaped and before they are laminated.

8 Claims, No Drawings

3,904,460

TREATING GLASS SHEETS

RELATION TO OTHER APPLICATIONS

This application is a continuation of application Ser. No. 103,916 of John Comperatore, filed Jan. 4, 1971 for TREATING GLASS SHEETS, now abandoned which application in turn, is a continuation-in-part of application Ser. No. 736,019 of John Comperatore, filed June 11, 1968 for TREATING GLASS SHEETS, now abandoned.

BACKGROUND OF THE INVENTION

This invention relates to TREATING GLASS SHEETS and particularly relates to fabricating laminated bent safety glass windows.

In the past, laminated safety glass windshields for use in automobiles have been produced by bending glass sheets in pairs by gravity sagging. A chosen pair of glass sheets was mounted in superimposed position over the shaping surface of a bending mold of the outline type and the glass sheets moved through a tunnel-like enclosed furnace where the glass was heated to its deformation temperature and sagged to conform to the upward facing shaped surface of the outline type mold. If glass sheets were to be bent to relatively sharp curvatures, it was necessary to sectionalize the mold so that the end mold sections would move into a spread apart position for receiving the flat glass sheets preparatory to bending and move into a closed mold position wherein the mold sections formed a substantially continuous shaping surface conforming in elevation and outline to the shape desired for the bent glass sheets. The glass sheets, on being heated, sagged to conform to the shaping surface on the outline mold.

After the sheets were bent in pairs, they were separated and assembled to form a sandwich with the bent glass disposed on opposite sides of a sheet of plastic interlayer material such as plasticized polyvinyl butyral. Curved laminated windshields were produced by laminating the assemblies so formed by exposure to heat and pressure in an autoclave.

Laminated windshields comprising bent glass sheets curved in pairs by the gravity sag technique using outline molds have several drawbacks. For one thing, glass sheets bent by gravity sagging on outline molds are characterized by uncontrolled sag in the intermediate regions not engaged by the outline mold. It is extremely difficult to laminate a pair of bent glass sheets to opposite sides of a sheet of plastic interlayer material, particularly in the intermediate regions where the glass sheets do not conform exactly to one another because of the difficulty of controlling the sag in the bent glass, especially in their unsupported center region.

The use of heat-absorbing members within and below the outline of the mold has controlled sagging to some extent. However, it is difficult to store molds provided with additional heat-absorbing members and it is a considerable waste of thermal energy to convey large masses of heat-absorbing material other than the glass sheets through a furnace during the heating of the glass to a temperature sufficient for its sagging into conformity with the outline mold.

Furthermore, it is necessary to maintain a large inventory of molds for each pattern to be produced in order to produce bent windshields at a rate sufficient to meet the insatiable demands of the automobile manufacturers.

In recent years, the fabrication of bent, tempered products for use as curved windows has been changed from a technique involving gravity sagging followed by sudden chilling to one where the glass sheet is shaped more exactly to a desired configuration throughout its entire extent. One of these methods involves pressing a glass sheet between a pair of complemental shaping members that shape the heat-softened glass much like a die stamping operation as depicted in U.S. Pat. No. 3,508,903 or U.S. Pat. No. 3,367,764 to Samuel L. Seymour. Such press bending as described in the Examples that follow involves the application of a pressurized engagement against a heat-softened glass sheet by a press bending mold of the type described in U.S. Pat. No. 3,367,764 to Samuel L. Seymour. The mold described in said patent comprises a glass shaping member having a major surface whose shape and areal extent approximates that of the shape and areal extent desired for the glass sheet after bending. Hence, such press bending apparatus inherently engages the glass sheet throughout substantially its entire area.

Only one pair of molds is needed for each pattern destined for high speed production by the press bending method. In contrast, more than 100 molds are needed for a complete set of gravity sag bending molds for producing bent glass sheets on a mass production basis at a rate sufficient to satisfy the customer demands. It is almost impossible to produce so many molds sufficiently identical to one another to enable one of the glass sheets shaped by gravity sagging on one mold to provide a satisfactory match for lamination with either of the glass sheets shaped by gravity sagging on another mold of the set.

Glass sheets produced by press bending using substantially its entire areal extent while the sheet is heat-softened conform more nearly exactly to the shape desired throughout the entire extent of the glass than gravity sagged sheets that are bent to conform to outline molds, because the latter conform only at their margins. Therefore, gravity sagged sheets are more likely to have optical deviations which annoy people viewing objects through the curved windows of automobiles, even when those are not subsequently laminated. In cases where gravity sagged sheets of different bending pairs are laminated, it is difficult to match two glass sheets properly to provide a laminated structure that gives the appearance of a single glass sheet after lamination, unless exceptionally thick interlayer materials are used.

When two glass sheets are sagged as a pair, they must also be laminated together. In recent years, study of safety windshields has indicated that windshields comprising one specially treated sheet or one having a different thickness or composition than the other sheet laminated to opposite sides of a plastic interlayer produced a safer laminated windshield than sheets of identical composition and identical thicknesses under certain circumstances. In the event one of the sheets of a bent pair is removed from the other of a bent pair for special processing between the bending and the laminating steps, it is difficult to rematch the same two sheets after the optional special treatment of one or both sheets to render the ultimate laminate safer unless an expensive identification and storage control system is used. Otherwise, any benefit of matching sheets of the same bending pair to reduce the mismatching between sheets is lost unless the same two sheets that were bent in pairs are ultimately laminated.

The present invention has determined that it is practical to press bend or form each glass sheet individually and then laminate two press bent sheets together after special treatment of one or both sheets. The press bending operation need no longer be limited to the use of monolithic sheets to be subsequently tempered. For example, only the outer sheet of the laminate may be coated with a metal oxide coating in the form of a band extending along its upper edge before it is bent, as taught in U.S. Pat. No. 3,078,693 to William O. Lytle, or after it is shaped, as taught by U.S. Pat. No. 3,021,227 to Ronald E. Richardson. As another possibility, only the inner sheet of the windshield may be thermally tempered after press bending, as taught by U.S. Pat. No. 3,298,809 to Herbert W. Barch and Clement E. Valchar. The heat-strengthened sheet so produced is laminated to a sheet that is not strengthened sufficiently to impart a temper, with the strengthened sheet disposed as the inner sheet of the laminated windshield. Another possibility is to strengthen only the inner sheet of the laminated windshield before lamination by using the chemical strengthening technique of U.S. Pat. No. 3,218,220 to Neill Weber, which replaces sodium ions in the surface of a soda-lime-silica glass with larger diameter potassium ions at a temperature below the strain point of the glass to place the surface layer of glass in compression stress, then laminating the chemically strengthened glass sheet to a press bent sheet of unstrengthened glass to form a laminated windshield of the type disclosed and claimed in U.S. Pat. No. 3,396,075 to John W. Morris or in U.S. patent application Ser. No. 790,537 of Raymond G. Rieser and Joseph Chabal, filed Jan. 13, 1969 now U.S. Pat. No. 3,558,415.

According to the present invention, each glass sheet to be laminated is handled individually and press bent or shaped to its desired shape between a pair of shaping members that cause the sheet to assume an exact shape throughout its entire extent. Then, if desired, one or both of the sheets is treated to impart special desired characteristics thereto before the sheets are assembled for their final lamination.

If the sheets are to be bent to relatively sharp bends wherein the thickness of the sheet and the interlayer material to be disposed between the sheets in the final laminated product causes a significant variation in the individual sheet curvature required to laminate the two glass sheets together, the present invention involves press bending to impart a slightly different curvature to the two glass sheets. By handling the two glass sheets separately, it is possible to perform an optional treatment to only one of the sheets.

The term "treating" as used in this description encompases such operations as thermally tempering or chemically strengthening one and/or the other of the sheets or applying a coating, which may be electroconductive and/or heat screening and/or phototropic, to one and/or the other sheet so as to provide the laminated product with any desirable properties.

The nature of the press bending or forming operation is such that any sheet that is press bent to form the outer sheet of a laminate can be laminated to any other sheet that has been press bent to form the interior sheet of a laminate with minimum chance of a mismatch. In employing the gravity sag technique described hereinabove to bend glass sheets in pairs and then laminating them, it is virtually impossible to obtain an exact match between two sheets that have not been bent simultaneously by the gravity sag technique.

Where glass sheets are bent to rather shallow curvatures of substantially uniform radius of curvature, such as cylindrical bends which are suitable for curved automobile sidelights, a single press bending line has been found to be suitable.

EXAMPLE I

Glass sheets of polished plate glass 24 inches by 24 inches by ⅛ inch have been press bent on a single line to cylindrical curvature of 90 inch radius and cooled to impart a partial temper. The individual sheets were suspended from tongs and passed through a tunnel-like furnace in series where they were heated to about 1220° Fahrenheit, then removed from the furnace and immediately sandwiched in pressurized engagement between a pair of complementary press bending molds for a period of about 2 seconds to impress the desired curvature. The molds were retracted and the glass sheets passed between a series of nozzles through which cold air was applied under pressure at a rate sufficient to impart a semi-temper to the glass sheet. The bent glass sheets were then assembled with ⅛ inch thick sheets of plasticized polyvinyl butyral interlayer material. The assemblies of two bent glass sheets and plastic interlayer were laminated using the usual production technique of elevated temperature and pressure in an oil autoclave. Nine of 12 assemblies were completely clear throughout their entire extent after the first attempt at lamination. The other three assemblies were not completely clear after lamination, but were capable of becoming completely cleared after repeating the laminating step.

EXAMPLE II

Several laminated backlights of V-shaped configuration were produced by press bending individual plate glass sheets approximately 60 inches long, 20 inches wide and having a nominal thickness of ⅛ inch using the following sequence. Each sheet was heated while conveyed through a tunnel-like furnace in 1 minute and 25 seconds. During this time the sheet was heated to a temperature in the range of 1225° to 1240° Fahrenheit. Each sheet was transferred in about 3½ seconds from the furnace to a position between a pair of pressing molds having complementary shaping surfaces of V-shaped configuration with the opposed center portions sharply bent about a vertically extending axis of bending having a 9-inch radius of curvature flanked by relatively flat regions. Each glass sheet was suspended vertically from tongs for this operation with its length extending horizontally and its width extending vertically.

The glass sheet was stopped when aligned between the complementary pressing molds, which were of the type disclosed in U.S. Pat. No. 3,367,764 to Samuel L. Seymour and comprised a suitable reinforced steel shaping plate ¼-inch thick covered with knit fiber glass cloth of textured yarn of the type disclosed and claimed in U.S. Pat. No. 3,148,968 to James H. Cypher and Clement E. Valchar. The pressing molds moved from a retracted position to a glass engaging position in about 1½ seconds and held the glass in pressurized engagement of about 1 pound per square inch throughout its entire extent for 1 second and then were retracted.

The tong-gripped press-bent glass sheet then was transferred in about 3 seconds to a cooling station where the glass was quenched with air blasts from moving nozzles having their openings spaced 6 inches apart by applying a pressure of about 8 ounces per square inch against the protruding glass surface and about 6 ounces per square inch against the receding glass surface for about 10 seconds. Glass sheets so treated had a surface compression stress of 5,000 pounds per square inch.

The press bent glass sheets were then assembled in pairs and each pair was assembled with a sheet of plasticized polyvinyl butyral having a thickness of 0.030 inch and cut to outline matching those of the glass sheets.

The glass-plastic assemblies were then laminated in the manner described in U.S. Pat. No. 2,948,645 to Laurence A. Keim and the bent laminated assemblies inspected for their optical properties. Their optical properties were acceptable for commercial purposes.

The laminating operation was of a two step type. The first step, called prepressing, involved evacuating air from a peripheral conduit formed by enclosing the periphery and margin only of the assembly with a flexible, channel-shaped member made of a fluid-impervious material while the assembly was heated to an elevated temperature such as about 150° to 350° Fahrenheit for a sufficient length of time to seal or bond at least a narrow marginal portion of the assembly. Then, the conduit was removed and the completely exposed assembly was subjected to a standard autoclave treatment utilizing a temperature of between 190° and 325° Fahrenheit and a simultaneous pressure of between 100 and 250 pounds per square inch for sufficient time to transform the plasticized polyvinyl butyral into a clear transparent sheet bonded to the glass sheets throughout their extent.

EXAMPLE III

The same pattern of laminated backlights were produced, except that sheet glass 0.090 inch thick was used instead of the plate glass sheets of ⅛-inch thickness that were press bent in Example II. The sheet glass attained a temperature in the desired range of 1225° to 1240° Fahrenheit after one minute exposure in the furnace. The other steps of the operation were as in Example II. The laminates of sheet glass that were produced appeared to be laminated securely to the opposite sides of the plastic interlayer.

EXAMPLE IV

Additional laminated backlights were produced from plate glass sheets of ⅛-inch thickness as in Example II, except that half the sheets press bent in this experiment were not tempered and the other half were cooled rapidly as described in Example II. Glass-plastic assemblies were prepared for lamination by sandwiching a sheet of plasticized polyvinyl butyral 0.030 inch thick between a press bent tempered sheet and a press bent untempered sheet, using the laminating technique described and claimed in the aforesaid U.S. Pat. No. 2,948,645 to Laurence A. Keim.

The laminated windshields so produced had good optical clarity throughout their extent including the sharply bent central region. This clarity indicated good adhesion between the glass sheets and the plastic interlayer.

EXAMPLE V

In press bending two glass sheets to more complicated curvatures, two slightly different pressing molds are used. Typical windshields that require such processing are the compound or twin-wrap windshields popular in certain 1957 to 1959 automobile models, which comprised two glass sheets of ⅛-inch nominal thickness of commerical soda-lime-silica plate glass bent to a continuous wrap-around bend with sharply bent regions about their transverse axis to form end portions extending rearward of the automobile from the main windshield portion and bent about an axis extending longitudinally to form a roof portion extending rearward of the main portion plus an interlayer of plasticized polyvinyl butyral 0.015 inch thick.

In producing these complicated shapes, one pressing mold shapes one set of glass sheets to produce the pattern required for the outer glass sheet of the laminated windshields and another pressing mold shapes another set of glass sheets to produce the slightly different pattern required for the inner glass sheet of the laminated windshield.

Traditionally, such laminated windshields have incorporated a plastic interlayer having a dyed band extending across the top portion of the windshield and both glass sheets have been composed of tinted glass (usually a special soda-lime-silica glass incorporating about 0.5 percent to 0.6 percent by weight of iron oxide) having special properties of low heat transmission and high visible light transmission. It is now possible to use undyed plastic as the interlayer. The set of outer glass sheets is coated with a band of heat-screening metal oxide coating on a tinted glass and then press bent to the shape required for the outer glass sheet, while the set of inner glass sheets is thermally and/or chemically strengthened before laminating a sheet of the first set to a sheet of the second set.

The inner sheet can be composed of a clear glass composition rather than a tinted glass composition. Such a combination results in a more economical operation, because making the tinted glass compositions tends to reduce the life of a refractory tank in which the glass making ingredients are melted to form the glass composition. Hence, the present invention makes possible the use of half the tinted glass needed for a given volume of windshields compared to the amount of tinted glass needed for prior art windshields, where both sheets of glass were tinted and bent by gravity sagging while in superimposed relation over an outline bending mold and then laminated.

The present invention also makes it possible to use cast-in-place resins as the interlayer material on laminating press bent coated glass sheets to press bent uncoated glass sheets. Typical laminates comprising cast-in-place polyurethane compositions are found in Canadian Pat. Nos. 673,674 and 673,678 to Vernon G. Ammons, Michael E. Dufala and Marco Wismer.

Typical polyurethane compositions for the interlayer of bent safety glass windshields may be of two general types. The polyurethane compositions of one type comprises the reaction product of poly (tetramethylene oxide) glycol having an average molecular weight from about 550 to about 3000, a diisocyanate and a curing agent comprising a polyamine or a curing system comprising a polyamine and a polyol. The polyurethane composition of the other type comprises a reaction product of a poly (tetramethylene oxide) glycol having an average molecular weight of from about 550 to 1800, a diisocyanate and a curing agent comprising a polyol containing at least three hydroxyl groups and a diol.

Suitable polyamines for the first general type of curing agent or system include 4,4'-methylene-bis (2-chloroaniline); diamino diphenyl sulfone; and diallylmelamine. Suitable polyols for this type include 1,4-butanediol; 1,5-pentanediol; trimethylol propane; the reaction product of sucrose with an alkylene oxide and poly (alkalene oxide) glycol. Toluene diisocyante is a suitable diisocyante for this type.

In the second general type of polyurethane composition, suitable polyols include trimethyl propane, sorbitol and castor oil. Suitable diols for this latter type of polyurethane composition include 1,4-butanediol; 1,5-pentanediol and 2-methyl-2-n-propyl-1,3-propanediol. Toluene diisocyante is also suitable as the diisocyante of this latter type of composition.

The polyurethane composition is applied in liquid form between a pair of press bent glass sheets held apart by a marginal spacer. The polyurethane glass assembly so formed is then heated for at least one-half hour at a temperature ranging between 200° and 300° Fahrenheit to cure the polyurethane into an adherent, transparent interlayer bonded to the glass.

If a cast-in-place type of polyurethane composition is used as the interlayer, it is not necessary to press bend the outer glass sheet to a different curvature that the inner glass sheet when producing the complicated bends of Example V. When the polyurethane composition is cast between a pair of press bent plates, it flows to conform to the shape of the adjacent facing glass surfaces and then sets to form a composite, transparent laminated windshield.

The present invention has enabled windshield fabricators to produce a greater variety of laminated glass-plastic windshields than previously, has rendered windshield fabrication more flexible and has enabled windshield fabricators to produce laminated windshields having certain shapes that could not be produced by glass sagging and other that could be produced using glass sagging techniques only if the glass is weakened. For example, V-shaped windshields could only be formed by first forming a groove along a line corresponding to the axis of sharpest bend and then concentrating heat along the line of the groove. Such grooving weakens the glass in its most critical location.

The form of the invention shown and described in this disclosure represents an illustrative preferred embodiment and certain modifications thereof. It is understood that the idea of press bending glass sheets individually so that one set of sheets may be treated differently from another set before any one glass sheet of the one set is laminated to any one glass sheet of the second set is not limited to the specific embodiments of glass sheet treatments or interlayer material described above, but other treatments and other methods of laminating such as injection molding the interlayer and other laminating materials such as silicones and the like may be substituted for the polymerized polyvinyl acetal sheeting and polyurethanes described without departing from the spirit of the invention as defined in the claimed subject matter that follows.

I claim:

1. In the art of making a bent laminated safety glass windshield comprising an outer glass sheet, an inner glass sheet and an intermediate layer of transparent plastic material adhering to said glass sheets together wherein said glass sheets are first shaped to different curvatures desired for said outer and inner glass sheets respectively of said bent laminated windshield and then laminated to one another with said layer of plastic therebetween, the improvement comprising
   a. disposing a single glass sheet while at an elevated temperature range sufficient to deform said glass sheet between a pair of press bending molds having complementary shaping surfaces capable of shaping a heat-softened glass sheet into approximately the curvature desired for said outer glass sheet of said bent laminated windshield,
   b. engaging said single glass sheet between said pair of press bending molds throughout substantially its entire areal extent while said sheet is at said elevated temperature range to shape said sheet to its desired curvature throughout substantially its entire extent,
   c. cooling said glass sheet,
   d. disposing another single glass sheet while at said elevated temperature range between a pair of press bending molds having complementary shaping surfaces capable of shaping a heat-softened glass sheet into approximately the curvature desired for said inner glass sheet of said bent laminated windshield, the curvature desired for said inner glass sheet differing from that desired for said outer glass sheet by a factor dependent upon the thickness of said intermediate layer, the thickness of one of said glass sheets and the sharpness of the bend of said windshield,
   e. engaging said another glass sheet between said press bending molds throughout substantially its entire areal extent while said glass sheet is at said elevated temperature range to shape said another sheet to its desired curvature throughout substantially its entire extent,
   f. cooling said another glass sheet, at least one of said glass sheets being cooled at a rate sufficient to impart at least a partial temper thereto,
   g. assembling said shaped glass sheets so that one of said glass sheets occupies the position of said outer glass sheet and the other of said glass sheets occupies the position of said inner glass sheet with a layer of plastic interlayer material therebetween to form an assembly, and
   h. subjecting said assembly of said glass sheets and said layer of plastic interlayer material to an elevated temperature and elevated pressure for sufficient time to laminate said assembly into a unitary structure.

2. The method according to claim 1, wherein said plastic interlayer material is taken from the class consisting of polyvinyl butyral and polyurethane.

3. The method according to claim 2, wherein said first and second individually shaped glass sheets are laminated to a sheet of plasticized polyvinyl butyral at a temperature ranging between about 190° and 325° Fahrenheit and a pressure ranging between about 100 and 250 pounds per square inch for sufficient time to transform said polyvinyl butyral into a clear, transparent sheet bonded to said glass sheets throughout their extent.

4. The method according to claim 2, wherein said individually shaped glass sheets are laminated by casting in place a polyurethane composition in liquid form between said first and second press bent glass sheets and maintaining the assembly so produced in their assembled relation for at least one-half hour at a temperature of between 200° and 300° Fahrenheit until the polyurethane composition sets to form a clear, transparent sheet bonded to said glass sheets throughout their extent.

5. The method according to claim 1, further including chemically strengthening at least one of said sheets of glass between the aforesaid individual shaping operations and the laminating operation.

6. The method according to claim 5, wherein at least one of said glass sheets is subjected to a treatment that comprises replacing alkali metal ions in its surface layer with larger diameter ions at a temperature below the strain point of the glass after said shaping step and before said laminating step.

7. The method according to claim 1, wherein a plurality of glass sheets are shaped individually to approximately the curvature desired for the outer glass sheet using a pressing mold of one configuration according to steps (a), (b) and (c) and another plurality of glass sheets are shaped individually to approximately the curvature desired for the inner glass sheet using a pressing mold of a different configuration according to steps (d), (e) and (f), further including assembling any shaped glass sheet produced from said plurality of glass sheets with any shaped glass sheet produced from said another plurality of glass sheets.

8. The method according to claim 1, wherein both said glass sheets are cooled sufficiently rapidly to impart at least a semi-temper thereto.

* * * * *